US012476748B2

(12) United States Patent
Moshfeghi

(10) Patent No.: US 12,476,748 B2
(45) Date of Patent: Nov. 18, 2025

(54) METHOD AND SYSTEM FOR A REPEATER NETWORK THAT UTILIZES DISTRIBUTED TRANSCEIVERS WITH ARRAY PROCESSING

(71) Applicant: GOLBA LLC, Rancho Palos Verdes, CA (US)

(72) Inventor: Mehran Moshfeghi, Rancho Palos Verdes, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 328 days.

(21) Appl. No.: 18/359,221

(22) Filed: Jul. 26, 2023

(65) Prior Publication Data

US 2023/0370216 A1 Nov. 16, 2023

Related U.S. Application Data

(63) Continuation of application No. 17/377,983, filed on Jul. 16, 2021, now Pat. No. 11,799,601, which is a
(Continued)

(51) Int. Cl.
*H04B 7/0408* (2017.01)
*H04B 1/40* (2015.01)
(Continued)

(52) U.S. Cl.
CPC ............. *H04L 5/0032* (2013.01); *H04B 1/40* (2013.01); *H04B 7/024* (2013.01); *H04B 7/0408* (2013.01);
(Continued)

(58) Field of Classification Search
CPC ........ H04L 5/0032; H04L 27/12; H04W 4/80; H04W 72/542; H04W 24/08;
(Continued)

(56) References Cited

U.S. PATENT DOCUMENTS

| 5,677,796 A | 10/1997 | Zimmerman et al. |
| 6,934,511 B1 * | 8/2005 | Lovinggood ..........  H01Q 1/007 455/24 |

(Continued)

OTHER PUBLICATIONS

Non-Final Office Action for U.S. Appl. No. 17/011,042 dated Sep. 15, 2023.
(Continued)

*Primary Examiner* — April G Gonzales
(74) *Attorney, Agent, or Firm* — CHIP LAW GROUP

(57) ABSTRACT

A method in a relay device that comprises a plurality of antenna arrays, includes configuring first beamforming setting for first set of antenna arrays of the plurality of antenna arrays of the relay device to establish a first link between the relay device and a source device. A first data stream is received with a first beam pattern from the source device through the first link and a second data stream with a second beam pattern is forwarded to a destination device through second link without de-modulating the first data stream. The method includes phase shifting, by antenna array of the plurality of antenna arrays, an incoming signal stream and an outgoing signal stream by a different value for each element within the first set of antenna arrays to minimize an interference between the incoming signal stream and the outgoing signal stream, respectively, through the phase shifting.

16 Claims, 8 Drawing Sheets

Related U.S. Application Data continuation of application No. 16/451,980, filed on Jun. 25, 2019, now Pat. No. 11,128,415, which is a continuation of application No. 16/153,735, filed on Oct. 6, 2018, now Pat. No. 10,965,411, which is a continuation of application No. 15/853,537, filed on Dec. 22, 2017, now Pat. No. 10,103,853, which is a continuation of application No. 13/473,144, filed on May 16, 2012, now abandoned.

(60) Provisional application No. 61/548,201, filed on Oct. 17, 2011.

(51) Int. Cl.
| | | |
|---|---|---|
| *H04B 7/024* | (2017.01) | |
| *H04B 7/0413* | (2017.01) | |
| *H04B 7/0426* | (2017.01) | |
| *H04B 7/06* | (2006.01) | |
| *H04B 7/08* | (2006.01) | |
| *H04L 5/00* | (2006.01) | |
| *H04L 27/12* | (2006.01) | |
| *H04W 4/80* | (2018.01) | |
| *H04W 24/08* | (2009.01) | |
| *H04W 72/044* | (2023.01) | |
| *H04W 72/0453* | (2023.01) | |
| *H04W 72/542* | (2023.01) | |
| *H04W 88/02* | (2009.01) | |
| *H04W 88/06* | (2009.01) | |
| *H04W 84/12* | (2009.01) | |

(52) U.S. Cl.
CPC ........... *H04B 7/0413* (2013.01); *H04B 7/043* (2013.01); *H04B 7/0689* (2013.01); *H04B 7/0897* (2013.01); *H04L 27/12* (2013.01); *H04W 4/80* (2018.02); *H04W 24/08* (2013.01); *H04W 72/0453* (2013.01); *H04W 72/046* (2013.01); *H04W 72/0473* (2013.01); *H04W 72/542* (2023.01); *H04W 88/02* (2013.01); *H04W 88/06* (2013.01); *H04W 84/12* (2013.01); *Y02D 30/70* (2020.08)

(58) Field of Classification Search
CPC ........... H04W 72/0453; H04W 72/046; H04W 72/0473; H04W 88/02; H04W 88/06; H04W 84/12; H04B 1/40; H04B 7/024; H04B 7/0408; H04B 7/0413; H04B 7/043; H04B 7/0689; H04B 7/0897; Y02D 30/70
USPC .......................................................... 455/7
See application file for complete search history.

(56) References Cited

U.S. PATENT DOCUMENTS

| | | | | |
|---|---|---|---|---|
| 8,855,093 | B2* | 10/2014 | Rofougaran | G06F 15/163 |
| | | | | 370/342 |
| 9,252,908 | B1* | 2/2016 | Branlund | H04B 7/0617 |
| 9,829,560 | B2* | 11/2017 | Moshfeghi | H04W 64/006 |
| 10,854,995 | B2* | 12/2020 | Rofougaran | H01Q 3/26 |
| 11,394,128 | B2* | 7/2022 | Rofougaran | H01Q 3/38 |
| 11,715,890 | B2* | 8/2023 | Rofougaran | H01Q 21/24 |
| | | | | 343/702 |
| 11,799,601 | B2* | 10/2023 | Moshfeghi | H04W 88/02 |
| 2009/0113732 | A1* | 5/2009 | Rodriguez | H01Q 1/1242 |
| | | | | 33/299 |
| 2009/0156227 | A1* | 6/2009 | Frerking | H04B 7/0413 |
| | | | | 455/455 |
| 2010/0097976 | A1* | 4/2010 | Agrawal | H04L 1/1819 |
| | | | | 370/315 |
| 2011/0039496 | A1* | 2/2011 | Chueh | H04B 17/345 |
| | | | | 455/63.1 |
| 2011/0109507 | A1* | 5/2011 | Warnick | H01Q 21/0025 |
| | | | | 342/368 |
| 2011/0256877 | A1* | 10/2011 | Hoymann | H04B 7/155 |
| | | | | 455/445 |
| 2012/0149300 | A1* | 6/2012 | Forster | H04W 52/0229 |
| | | | | 455/11.1 |
| 2014/0104124 | A1* | 4/2014 | Chernokalov | H01Q 3/245 |
| | | | | 343/754 |
| 2014/0210668 | A1* | 7/2014 | Wang | H01Q 3/34 |
| | | | | 342/372 |
| 2016/0204513 | A1* | 7/2016 | Yemelong | H01Q 9/40 |
| | | | | 343/769 |
| 2016/0359230 | A1* | 12/2016 | Wang | H01Q 21/22 |
| 2017/0141886 | A1* | 5/2017 | Chung | H04L 5/006 |
| 2018/0191053 | A1* | 7/2018 | Ndip | H01L 24/73 |
| 2018/0231651 | A1* | 8/2018 | Charvat | G01S 7/282 |
| 2018/0269576 | A1* | 9/2018 | Scarborough | H01Q 25/007 |
| 2019/0020402 | A1* | 1/2019 | Gharavi | H04B 7/1555 |
| 2022/0158717 | A1* | 5/2022 | Frenger | H04B 7/0693 |
| 2022/0159695 | A1* | 5/2022 | Zheng | H04W 72/20 |
| 2025/0173682 | A1* | 5/2025 | Shkel | G06Q 10/063112 |

OTHER PUBLICATIONS

Non-Final Office Action for U.S. Appl. No. 17/903,092 dated Sep. 14, 2023.
Non-Final Office Action for U.S. Appl. No. 17/943,300 dated Sep. 27, 2023.
Notice of Allowance for U.S. Appl. No. 17/887,672 dated Oct. 17, 2023.
Notice of Allowance for U.S. Appl. No. 17/898,706 dated Aug. 8, 2023.
Final Office Action for U.S. Appl. No. 17/011,042 dated Jan. 5, 2024.
Final Office Action for U.S. Appl. No. 17/903,130 dated Nov. 9, 2023.
Non-Final Office Action for U.S. Appl. No. 18/323,002 dated Feb. 1, 2024.
Non-Final Office Action for U.S. Appl. No. 18/175,408 dated Jan. 5, 2024.
Non-Final Office Action for U.S. Appl. No. 18/321,114 dated Feb. 1, 2024.
Notice of Allowance for U.S. Appl. No. 17/943,300 dated Jan. 18, 2024.
Notice of Allowance for U.S. Appl. No. 18/083,756 dated Nov. 14, 2023.
Final Office Action for U.S. Appl. No. 17/903,092 dated Mar. 29, 2024.
Non-Final Office Action for U.S. Appl. No. 17/011,042 dated Apr. 29, 2024.
Non-Final Office Action for U.S. Appl. No. 18/321,160 dated Feb. 15, 2024.
Non-Final Office Action for U.S. Appl. No. 18/326,222 dated Apr. 19, 2024.
Notice of Allowance for U.S. Appl. No. 17/903,130 dated Mar. 25, 2024.
Notice of Allowance for U.S. Appl. No. 17/988,827 dated Feb. 22, 2024.
Notice of Allowance for U.S. Appl. No. 18/323,002 dated May 15, 2024.
Final Office Action for U.S. Appl. No. 17/903,092, dated Dec. 19, 2024.
Non-Final Office Action for U.S. Appl. No. 18/321,160 dated Nov. 5, 2024.
Non-Final Office Action for U.S. Appl. No. 17/011,042, dated Dec. 5, 2024.
Non-Final Office Action for U.S. Appl. No. 18/175,408, dated Jan. 24, 2025.
Non-Final Office Action for U.S. Appl. No. 18/464,384, filed Jan. 16, 2025.

(56) References Cited

OTHER PUBLICATIONS

Notice of Allowance for U.S. Appl. No. 18/321,114 dated Oct. 18, 2024.
Notice of Allowance for U.S. Appl. No. 18/321,160, dated Apr. 24, 2025.
Notice of Allowance for U.S. Appl. No. 17/011,042, dated Mar. 19, 2025.
Notice of Allowance for U.S. Appl. No. 17/903,092, dated Mar. 14, 2025.
Notice of Allowance for U.S. Appl. No. 18/175,408, dated Apr. 8, 2025.
Final Office Action for U.S. Appl. No. 17/011,042 dated Aug. 16, 2024.
Final Office Action for U.S. Appl. No. 18/175,408 dated Jun. 10, 2024.
Final Office Action for U.S. Appl. No. 18/321,160 dated May 30, 2024.
Non-Final Office Action for U.S. Appl. No. 17/903,092 dated Jul. 5, 2024.
Non-Final Office Action for U.S. Appl. No. 18/321,114 dated May 17, 2024.
Notice of Allowance for U.S. Appl. No. 17/903,130 dated Jul. 15, 2024.
Notice of Allowance for U.S. Appl. No. 18/326,222 dated Jul. 29, 2024.

* cited by examiner

METHOD AND SYSTEM FOR A REPEATER NETWORK THAT UTILIZES DISTRIBUTED TRANSCEIVERS WITH ARRAY PROCESSING

CLAIM OF PRIORITY

This patent application is a continuation application of U.S. patent application Ser. No. 17/377,983 filed on Jul. 16, 2021, which is a continuation application of U.S. Pat. No. 11,128,415 Issued on Sep. 21, 2021, which is a continuation application of U.S. Pat. No. 10,965,411 issued on Mar. 30, 2021, which is a continuation application of U.S. Pat. No. 10,103,853 issued on Oct. 16, 2018, which is a continuation application of U.S. patent application Ser. No. 13/473,144 filed on May 16, 2012, which makes reference to, claims priority to and claims benefit from U.S. Provisional Application Ser. No. 61/548,201 filed on Oct. 17, 2011

The above stated application is hereby incorporated herein by reference in its entirety.

CROSS-REFERENCE TO RELATED APPLICATIONS/INCORPORATION BY REFERENCE

This application makes reference to:
U.S. application Ser. No. 13/473,096, filed on May 16, 2012, now patented as U.S. Pat. No. 9,112,648;
U.S. application Ser. No. 13/473,105, filed on May 16, 2012, now patented as U.S. Pat. No. 8,817,678;
U.S. application Ser. No. 13/473,160, filed on May 16, 2012, now patented as U.S. Pat. No. 9,780,928;
U.S. application Ser. No. 13/473,180, filed on May 16, 2012, now patented as U.S. Pat. No. 8,780,943;
U.S. application Ser. No. 13/473,113, filed on May 16, 2012, now patented as U.S. Pat. No. 9,225,482; and
U.S. application Ser. No. 13/473,083, filed on May 16, 2012, now patented as U.S. Pat. No. 9,037,094.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and a system for a repeater network that utilizes distributed transceivers with array processing.

BACKGROUND OF THE INVENTION

Millimeter Wave (mmWave) devices are being utilized for high throughput wireless communications at very high carrier frequencies. There are several standards bodies such as 60 GHz wireless standard, WirelessHD, WiGig, and WiFi IEEE 802.1 lad that utilize high frequencies such as the 60 GHz frequency spectrum for high throughput wireless communications. In the US, the 60 GHz spectrum band may be used for unlicensed short range data links such as, for example, data links within a range of 1.7 km, with data throughputs up to 6 Gbits/s. These higher frequencies may provide smaller wavelengths and enable the use of small high gain antennas. However, these higher frequencies may experience high propagation loss. Other applications may include fixed wireless communications, such as wireless backhaul links between cellular base stations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a repeater network that utilizes distributed transceivers with array processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for repeater network that utilizes distributed transceivers with array processing. In various embodiments of the invention, a relay device that comprises a plurality of distributed transceivers, a central processor and a network management engine, may relay an input data stream from a source device to at least one other device. In this regard, the relaying may comprise configuring one or more of the plurality of distributed transceivers to operate in a particular mode of relay operation. The input data stream may be from the source device via at least one of the configured distributed transceivers. At least one relay data stream corresponding to the input data stream may be transmitted to the other device, via at least one of the configured distributed transceivers. The one other device may comprise another relay device, or a destination device for the input data stream. The source device may comprise another relay device or an original source device for the input data stream. The particular mode of relay operation may be determined based on one or more performance criteria, which may pertain to, for example, link quality and/or propagation environment.

The particular mode of relay operation may be selected from a plurality of modes of relay operation. In this regard, the plurality of modes of relay operation may comprise a passive mode of relay operation and an active mode of relay operation. The passive mode of relay operation may comprise forwarding the data stream unprocessed, whereas the active mode of relay operation may comprise performing digital signal processing by the central processor of the relay device during the reception of the input data stream and/or transmission of the at least one relay data stream. The network management engine may monitor during relay operations, one or more communication parameters or conditions associated with the configuration of the one or more of the plurality of distributed transceivers. Beamforming settings and/or antenna arrangement for at least one of the configured distributed transceivers may be configured based on the monitoring. The relay device may determine and/or select connection types and communication protocols that may be applied to the relay operations, and may allocate resources to the one or more of the plurality of distributed transceivers. Resources may be shared among the one or more of the plurality of distributed transceivers during the relay operations.

Figure 1A:
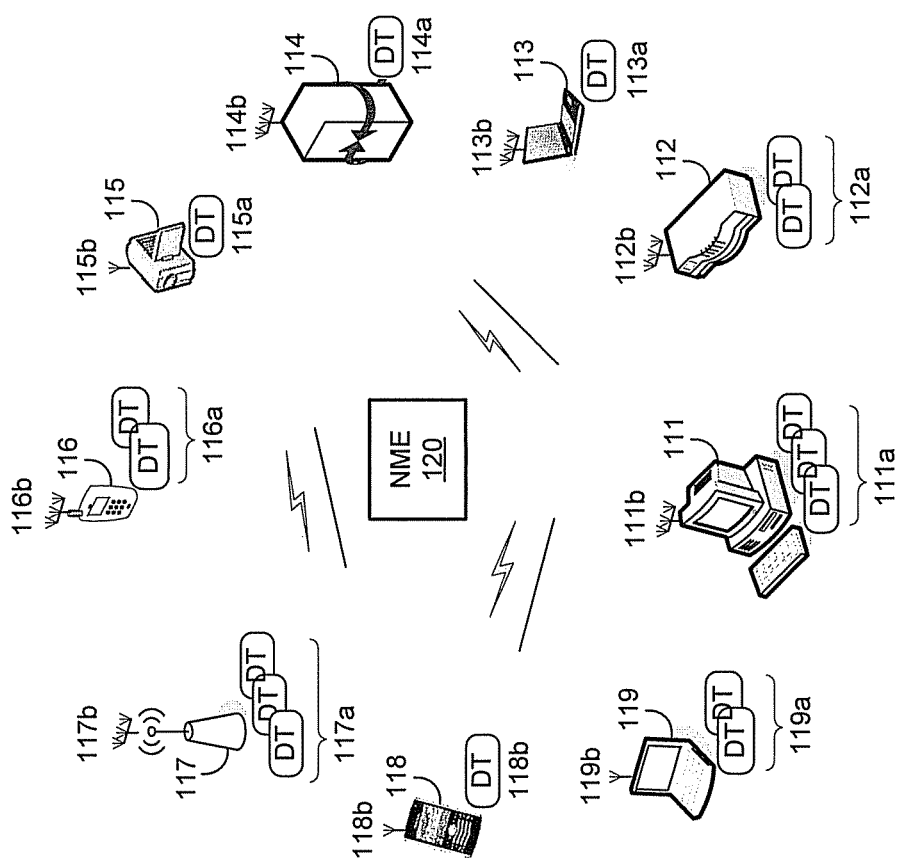
FIG. 1A is a block diagram illustrating an exemplary communication system that support centralized distributed transceiver management, in accordance with an embodiment of the invention.

FIG. 1A is a block diagram illustrating an exemplary communication system that support centralized distributed transceiver management, in accordance with an embodiment of the invention. Referring to FIG. 1A, there is shown a communication network 100 comprising a plurality of application devices, of which application devices 111-119 are displayed.

The application devices 111-119 may comprise suitable logic, circuitry, code, and/or interfaces that may be operable to communicate voice and data with one to another over wired and/or wireless connections. In an exemplary embodiment of the invention, each of the application devices 111-119 in the communication network 100 may comprise one or more distributed transceivers (DTs) for communication in the communication network 100. For example, distributed transceivers 111a through 119a may be integrated in the application devices 111 through 119, respectively, and utilized for receiving and transmitting signals. Each distributed transceiver may be equipped with an independently configurable antenna or antenna array that is operable to transmit and receive signals over the air. For example, the distributed transceivers 111a each may be equipped with an independently configurable antenna array 111b, and the distributed transceiver 118a, however, may be equipped with a single independently configurable antenna 118b to transmit and receive signals over the air. Depending on device capabilities and user preferences, distributed transceivers such as the distributed transceivers 111a within the application device 111, for example, may comprise radios such as a millimeter Wave (mmWave), a WLAN, WiMax, Bluetooth, Bluetooth Low Energy (BLE), cellular radios, WiMAX radio, or other types of radios. In this regard, radios such as mmWave radios may be utilized at very high carrier frequencies for high throughput wireless communications.

In operation, the distributed transceivers 111a through 119a in the communication network 100 are physically positioned and oriented at different locations within corresponding application devices such like laptop, TV, gateway and/or set-top box. The distributed transceivers 111a through 119a may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate network microprocessor, for example. In an exemplary embodiment of the invention, an application device in the communication network 100 may act or function as a master application device or an end-user application device. An application device that comprises the network management engine 120 and/or may have access to manage or control the network management engine 120 to dynamically configure and manage operation of the entire distributed transceivers in the communication network 100 is referred to a master application device. An application device that does not comprise the network management engine 120 and/or may have no access to manage or control the network management engine 120 is referred to as an end-user application device.

In some instances, the application device 111 acts as a master application device in the communication network 100. In an exemplary embodiment of the invention, the network management engine 120 in the master application device 111 may be utilized to configure, control, and manage the entire distributed transceivers 111a through 119a in the communication network 100 to optimize network performance. The application devices 111-119 each may operate in a transmission mode or in a receiving mode. In instances where the master application device 111 is transmitting multimedia information such as images, video, voice, as well as any other form of data to one or more receiving devices such as the end-user application devices 112-116, the network management engine 120 in the master application device 111 may be enabled to monitor and collect corresponding communication environment information from the end-user application devices 112-116. The collected communication environment information may comprise propagation environment conditions, link quality, device capabilities, antenna polarization, radiation pattern, antenna spacing, array geometry, device locations, target throughput, and/or application QoS requirements reported. The network management engine 120 may be operable to dynamically configure the distributed transceivers 111a-116a and associated antenna or antenna array 111b-116b, and to coordinate and manage the operation of the distributed transceivers 111a-116a and associated antenna or antenna array 111b-116b based on the collected communication environment information supplied from the end-user application devices 112-116. In this regard, the network management engine 120 may configure a single application device such as the application device 117 to maintain continuous connection with multiple different application devices such as the application devices 111-113.

The application device capabilities may comprise battery life, number of transceivers, number of antennas per transceiver, device interface types, processing protocols, service types, service classes and/or service requirements. The interface types for the application devices 111-119 may comprise access interface types such as Multimedia over Coax Alliance (MoCA), WiFi, Bluetooth, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Socket Layer (SSL) and control protocols such as Spanning Tree Protocol (STP). The IP layer protocols may comprise IP signaling protocols such as SIP and H.323, and IP media transport protocols such as TCP, UDP, RTP, RTC and RTCP. The link layer protocols may comprise technology-specific PHY and MAC layer protocols such as, for example, Multimedia over Coax Alliance (MoCA), WiFi, Ethernet, Femtocell, and/or cordless.

Although communication among the application devices 111-119 with one or more distributed transceivers is illustrated in FIG. 1, the invention may not be so limited. Accordingly, an application device may be operable to utilize one or more associated distributed transceivers to communicate with one or more application devices with normal transceivers without departing from the spirit and scope of various embodiments of the invention.

In an exemplary aspect of the invention, at least some of the application devices 111-119 may be configured as relay devices, which may be utilized in relaying data streams between two devices—that is a source device and a destination device. Using a particular application device as a relay device may be desirable when no direct links exist or are available between the source device and the destination device. For example, relaying data streams via intermediate relay devices may be utilized where direct Line-of-sight (LOS) links between the source device and the destination device are blocked by physical obstacles. Relaying data streams via intermediate relay devices may also be done in some instances where there is clear LOS between the source device and the destination device, and/or when direct links between these devices are available. For example, in some instances communication resources in the source device and/or the destination device may not be sufficient or optimal to maintain direct links therebetween. Also, in some instances, relaying data streams via intermediate relay devices may result in enhanced performance, and/or in reduction of resource use or power consumption, such as, for example, where communicating data streams via the relay device(s) may require less power or resources than communicating data streams directly between the source device and the destination device.

In an embodiment of the invention, a plurality of application devices may be combined into a relay mesh to provide relay services to any devices that may be in operating proximity to any of the devices in the relay mesh. In this regard, the network management engine 120 may be operable to, for example, dynamically select and/or configure application devices that may be included in the mesh network; to configure distributed transceivers in the mesh network, and antenna or antenna arrays associated with the distributed transceivers; and/or to coordinate and manage the operation of the distributed transceivers and associated antennas or antenna arrays. Furthermore, at least some of the configuration and/or other functions performed by the network management engine 120 may be based on the collected communication environment information supplied from the end-user application devices.

Figure 1B:
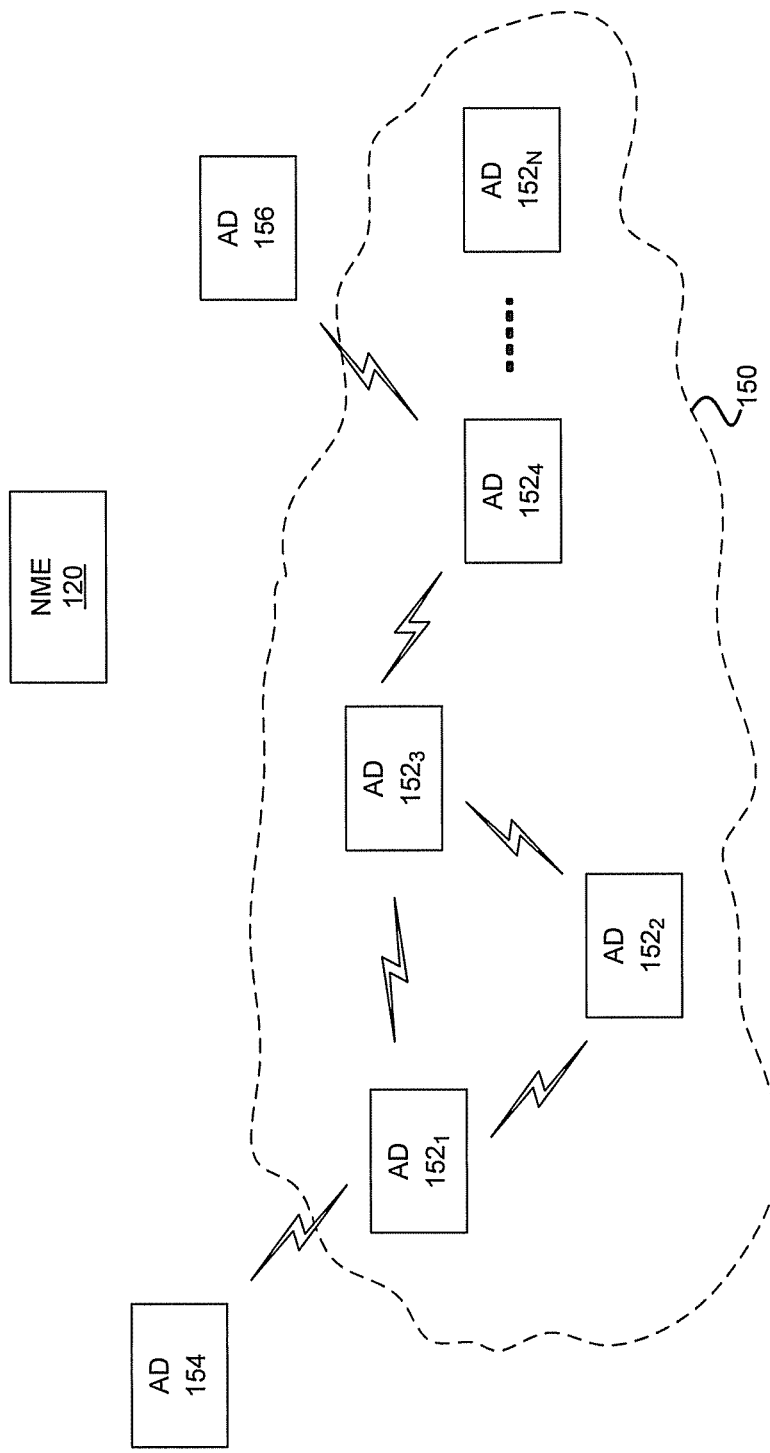
FIG. 1B is a block diagram illustrating an exemplary communication system that supports configuring a mesh of relay devices, in accordance with an embodiment of the invention.

FIG. 1B is a block diagram illustrating an exemplary communication system that supports configuring a mesh of relay devices, in accordance with an embodiment of the invention. Referring to FIG. 1B, there is shown a plurality of end-user application devices (AD) 152$_1$-152$_N$, 154, and 156, and the network management engine 120 of FIG. 1A.

The application devices 152$_1$-152$_N$, 154, and 156 may be similar to the application devices 111-119, substantially as described with regard to FIG. 1B, for example. In this regard, each of the application devices 152$_1$-152$_N$, 154, and 156 may comprise distributed transceivers (DTs), which may be utilized to support distributed based communications, substantially as described with respect to FIG. 1B, for example. In an exemplary aspect of the invention, the application devices 152$_1$-152$_N$, 154, and 156 may support a relay mode of operations, whereby one or more application devices may be configured to support forwarding data on behalf of other devices. In some embodiments, the devices that are primarily targeted for relay operation may deploy distributed transceivers with different beamforming and/or performance capabilities (i.e., covering a wide range of performance/capability). This may enable providing better flexibility to select the most suitable and/or optimal set of transceivers, such as depending on network and/or propagation conditions.

In an embodiment of the invention, a plurality of application devices, such as the application devices 152$_1$-152$_N$, may be configured to establish a relay mesh 150. In this regard, the relay mesh 150 may be established by forming device-to-device links among the application devices 152$_1$-152$_N$. The device-to-device links within the relay mesh 150 may be configured and/or established using distributed transceivers (DTs) of these devices. In this regard, the distributed transceivers of the application devices 152$_1$-152$_N$ may be physically positioned and oriented at different locations within corresponding application devices, and may be centrally managed by the network management engine (NME) 120, which may reside within a specific application device 152$_x$ in the relay mesh 150, and/or may be centralized as a full software implementation on a separate network microprocessor, for example. The relay mesh 150 may be utilized to relay communications between applications devices, including application devices that are outside the mesh relay 150 but in operating proximity to at least one of the applications devices 152$_1$-152$_N$ of the mesh network 150. Relaying communications within the mesh network may comprise traversing more than one application device. For example, to relay communications between application devices 154 and 156, application devices 152$_1$, 152$_3$, and 152$_4$ may be utilized.

In various embodiments of the invention, the relay operations within the relay mesh 150 may be adaptively managed. In this regard, adaptive management of relay operation may comprise dynamically and/or adaptively controlling and/or configuring communications within the relay mesh 150 and/or interactions among the application devices 152$_1$-152$_N$, to optimize performance of the application devices 152$_1$-152$_N$ and/or the relay mesh 150. For example, the network management engine 120 may query the application devices 152$_1$-152$_N$, to determine available resources and/or capabilities thereof, such as number and/or positioning of the distributed transceivers (DTs) of these devices. The network management engine 120 may then utilize data collected based on such query in selecting and/or configuring the devices during relay operations. In some embodiments of the invention, intelligent management of relay operations may comprise asymmetric communication between transceivers; selecting transceiver(s) utilized during the interactions based such criteria as location and/or proximity; adaptive configuration of transceivers (e.g., selection of optimal interface and/or attributes thereof); real-time monitoring of communication environment within the relay mesh 15, and dynamically controlling (re)configuration of transceivers in the mesh based on the monitoring; and/or managing frequency and/or channel allocation and reuse among the application devices and/or the transceivers.

Figure 2:
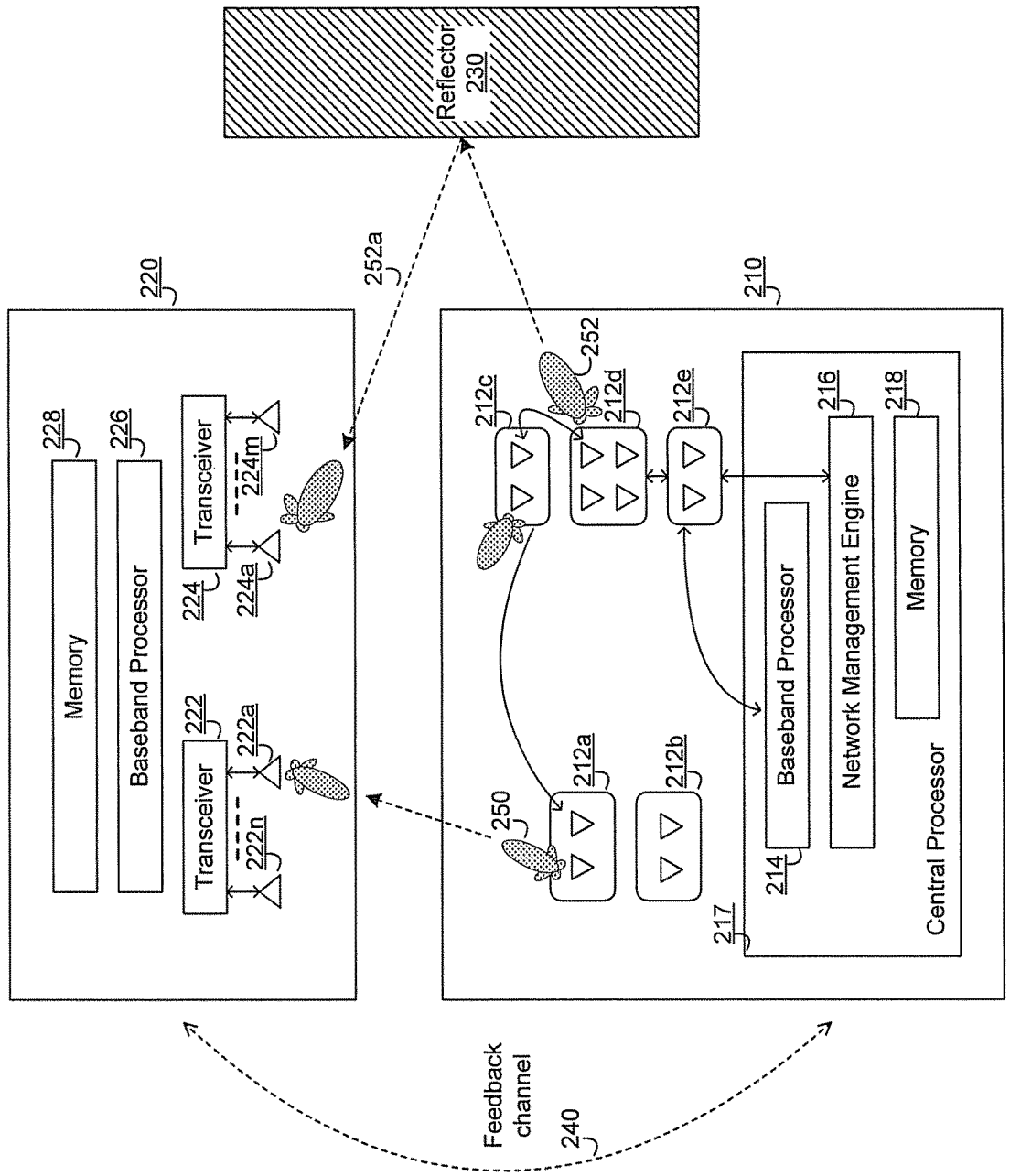
FIG. 2 is a diagram that illustrates an exemplary usage scenario where distributed transceivers are centrally managed to create a high-performance link between a transmitting device and one receiving device, in accordance with an embodiment of the invention.

FIG. 2 is a diagram that illustrates an exemplary usage scenario where distributed transceivers are centrally managed to create a high-performance link between a transmitting device and one receiving device, in accordance with an embodiment of the invention. Referring to FIG. 2, there is shown a master application device 210 and an end-user application device 220.

The master application device 210 may comprise suitable logic, circuitry, interfaces and/or code that may be operable to communicate multimedia information such as images, video, voice, as well as any other forms of data with one or more application devices such as the end-user application device 220. The master application device 210 may comprise a collection of distributed transceivers 212*a* through 212*e*, and a central processor 217 that comprises a central baseband processor 214, a network management engine 216 and a memory 218. In an exemplary embodiment of the invention, each of the collection of distributed transceivers 212*a* through 212*e* may be physically positioned and oriented at different locations within an application device such as a laptop, TV, gateway, and set-top box. In this regard, the collection of distributed transceivers 212*a* through 212*e* may be implemented in various ways such as, for example, a single distributed transceiver integrated in a single chip package; multiple silicon dies on one single chip; and multiple distributed transceivers on a single silicon die. Depending on device capabilities and user preferences, the distributed transceivers 212*a*-212*e* may be oriented in a fixed direction or multiple different directions. In another exemplary embodiment of the invention, the collection of distributed transceivers 212*a*-212*e* may be operable to receive and/or transmit radio frequency signals from and/or to the end-user application device 220 using air interface protocols specified in UMTS, GSM, LTE, WLAN, 60 GHz/mmWave, and/or WiMAX, for example. The end-user application device 220 may comprise suitable logic, circuitry, interfaces and/or code that may be operable to enable communication with other devices, such as the master application device 210. In this regard, the end-user application device 220 may be substantially similar to the master application device 210. For example, the end-user application device 220 may comprise transceivers 222 and 224, utilizing antennas (or antenna arrays) 222*a*-222*n* and 224*a*-224*m*, respectively, a baseband processor 226, and a memory 228.

The central baseband processor 214 may comprise suitable logic, circuitry, interfaces and/or code that may be operable to perform baseband digital signal processing needed for transmission and receiving operation of the entire collection of distributed transceivers 212*a* through 212*e*. For example, the central baseband processor 214 may be operable to perform waveform generation, equalization, and/or packet processing associated with the operation of the collection of distributed transceivers 212*a* through 212*e*. In addition, the central baseband processor 214 may be operable to configure, manage and control orientations of the distributed transceivers 212*a*-212*e*. The baseband processor 226 may be substantially similar to the central baseband processor 214.

The network management engine 216 may comprise suitable logic, circuitry, interfaces and/or code that may be operable to monitor and collect communication environment information such as propagation environment conditions, link quality, application device capabilities, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as the number of transceivers that are activated, the number of application devices that are being communicated with, adding/dropping application devices to the communication network 100. As shown in FIG. 2, the network management engine 216 is residing in the master application device 210. However, in some embodiments the network management engine 216 may reside on different network devices such as separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors for parallel baseband processing in order to increase throughput if needed.

The memory 218 may comprise suitable logic, circuitry, interfaces and/or code that may be operable to store information such as executable instructions and data that may be utilized by the central baseband processor 214 and/or other associated component units such as, for example, the network management engine 216. The memory 218 may comprise RAM, ROM, low latency nonvolatile memory such as flash memory and/or other suitable electronic data storage. The memory 228 may be substantially similar to the memory 218.

In an exemplary operation, a wireless link may be established between the master application device 210 and the end-user application device 220 through a reflector 230. In an exemplary embodiment of the invention, the master application device 210 may be operable to continuously scan the propagation environment to identify the directions and antenna patterns that result in strong reflected signals at the end-user application device 220. Then, the master application device 210 may associate each strong reflector with one of the collection of distributed transceivers 212*a* through 212*e* so as to transmit an independent different data stream to the end-user application device 220 over each distributed transceiver and through each strong reflector. For example, the master application device 210 transmits two data streams to the end-user application device 220 using two different distributed transceivers 212*a* and 212*d* that may use the same frequency channel. In particular, the distributed transceivers 212a may choose a beam pattern 250 and orientation for a direct LOS to a transceiver 222, for example, of the end-user application device 220 (the receiving device) and transmit a first data stream over a carrier frequency $RF_1$. On the other hand, the distributed transceivers 212d may choose a beam pattern 252 and orientation that is pointing towards the reflector 230 and transmit a second data stream also over the same carrier frequency $RF_1$. The reflector 230 then may reflect the beam 252 towards a different transceiver 224 of the end-user application device 220. The selection of the beam patterns 250 and 252 may come from the central baseband processor 214 and the network management engine 216. In an exemplary embodiment of the invention, the central baseband processor 214 may profile channel energy for directions of arrival and other schemes. The network management engine 216 may know communication environment information such as the number of users, number of streams needed, and/or available frequency channels. For example, the central baseband processor 214 and the network management engine 216 may select narrow beams for close devices and may select wide beams for further devices, respectively.

In one embodiment of the invention, the master application device 210 may be operable to utilize the reflector 230 for the second data stream, for example, to lower the chances of an object blocking both the first and second data streams, simultaneously. In other words, if a big enough object blocks the LOS between the master application device 210 and the end-user application device 220, the second data stream may likely be intact and sustained by complete direct reflecting through a reflected path 252a. Although FIG. 2 shows one reflector 230, in one embodiment of the invention, several reflectors may be used to transmit one data stream or multiple data streams. The use of multiple reflectors may provide reflection diversification in case one reflector or a sub-set of reflectors are blocked. In other words, instead of directing all transmit power towards one reflector only, the total transmit power may be distributed to propagate over a set of "good" reflectors in the environment. This distribution of power over different reflectors may be done in a controlled, configurable, adaptive, and intelligent manner. For example, reflectors may be chosen and targeted that provide better orthogonality between the different paths.

In FIG. 2, the master application device 210 may use a second reflector at a different location and another distributed transceiver 212c, for example, to communicate with the end-user application device 220 and send a third data stream. Also the reflected path 252a may be caused by more than one reflector where, for example, the distributed transceiver 212e transmits towards the reflector 230 and the reflection transmits towards a second reflector and the reflection of the second reflector reaches the end-user application device 220. In another embodiment of the invention, the first and second data streams in FIG. 2 may comprise the same data content and the use of LOS path and one or more reflector paths may provide link robustness for data content in case an obstacle blocks some of the paths.

The master application device 210 may continuously monitor and collect propagation environment conditions, link quality, device capabilities, locations, target throughput, and/or application QoS requirements reported from the end-user application device 220. In this regard, a feedback or negotiation channel 240 may be utilized to exchange and negotiate system configurations such as number of transceivers within devices, number of antennas per transceivers, the measured channel responses, the sequence of antenna array coefficients being evaluated, and/or device location. The feedback or negotiation channel 240 may be implemented through a WLAN, Bluetooth, and/or 60 GHz link, for example In some embodiments of the invention, the master application device 210 and/or the (slave) end-user application device 220 may deploy a plurality of baseband processors for implementing data processing requirements and/or demands. For example, multiple baseband processors may be deployed to generate and/or decode different data streams that may be transmitted or received by several distributed transceivers. In such configuration, the NME (e.g., NME 216) may be used to enable controlling and/or coordinating operation of the multiple baseband processors. In this regard, several internal connection topologies may be used. In some embodiments, each baseband processor may be dedicated and/or assigned to a subset of distributed transceivers available in the system, and for each baseband processor, ring and/or star topologies (explained later) may be used in interacting with corresponding transceiver(s). In this regard, there may be no data transfer between the subsets. In another embodiment, however, all baseband processors and transceivers (within a device) may be connected together through a ring topology (single cable). In such scenario, the baseband processors may coordinate sharing the single cable, such as based on time-multiplexing (same IF frequency) or frequency-multiplexing (different IF frequencies). The baseband processors may have different power, processing, and/or communication characteristics. Accordingly, in some embodiments, the baseband processor that is most suitable for a particular mode of operation (e.g., lower power consumption meeting the throughput requirement) may be selected and activated, with the other baseband processors remaining inactive and/or getting disabled.

Figure 3:
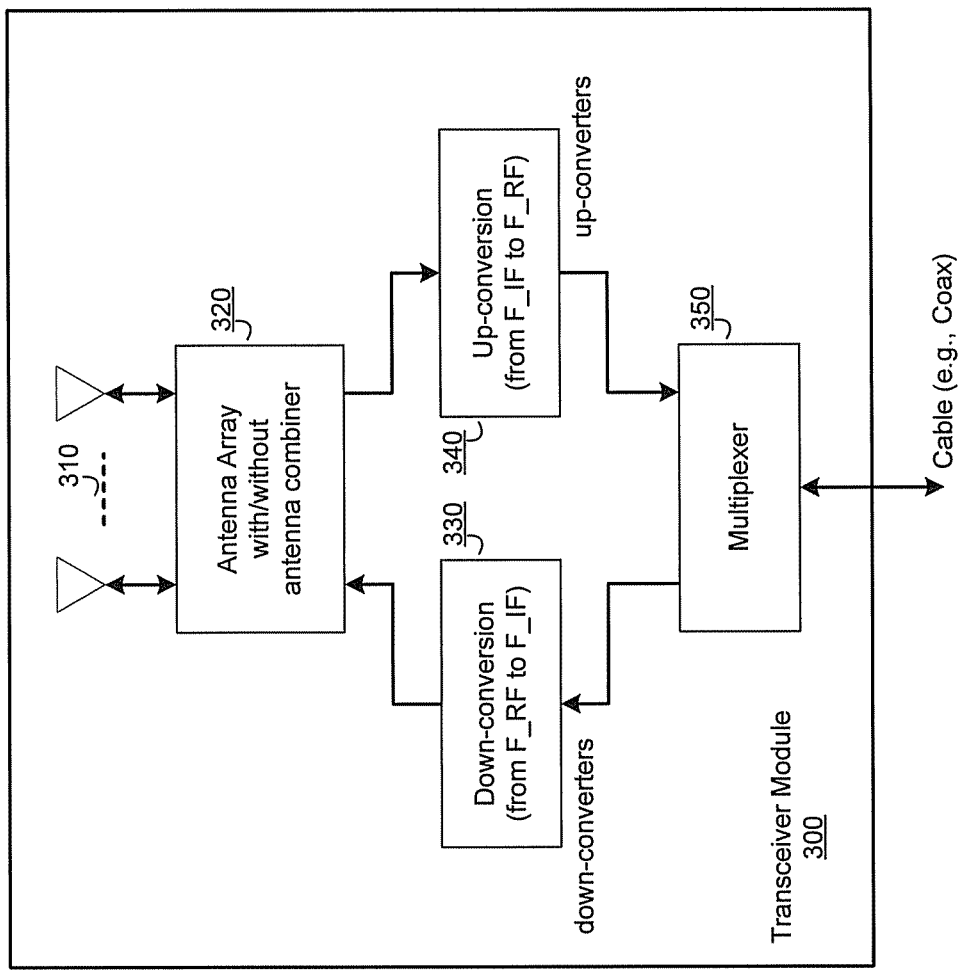
FIG. 3 is a diagram that illustrates an exemplary transceiver module, in accordance with an embodiment of the invention.

FIG. 3 is a diagram that illustrates an exemplary transceiver module, in accordance with an embodiment of the invention. Referring to FIG. 3, there is shown a transceiver 300 comprising an antenna array 310, an antenna array with/without antenna combiner 320, down-converters 330, up-converters 340, and a multiplexer 350.

In an exemplary operation, the antenna array 310 may comprise suitable logic, circuitry, interfaces and/or code that may be operable to transmit and receive radio frequency (RF) signals over the air. For transmission the transceiver 300 may be operable to receive a transmit signal from the central baseband processor 214. The transmit signal received from the central baseband processor 214 may be up-converted to RF frequency via the up-converters 340. For reception, the transceiver 300 may pass a receive signal from the antenna array 310 after down-conversion to the central baseband processor 214. The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converters 330 and/or signals after the up-converters 340. For example, in transmission operation the signal provided by the up-converters 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converters 330 may comprise suitable logic, circuitry, interfaces and/or code that may be operable to translate a radio frequency (RF) received from the antenna array 310 to an intermediate-frequency (IF) signal during reception. The up-converters 340 may comprise suitable logic, circuitry, interfaces and/or code that may be operable to translate an intermediate-frequency (IF) signal of a corresponding baseband signal supplied from the central baseband processor 214, for example to a RF signal during transmission.

Figure 4:
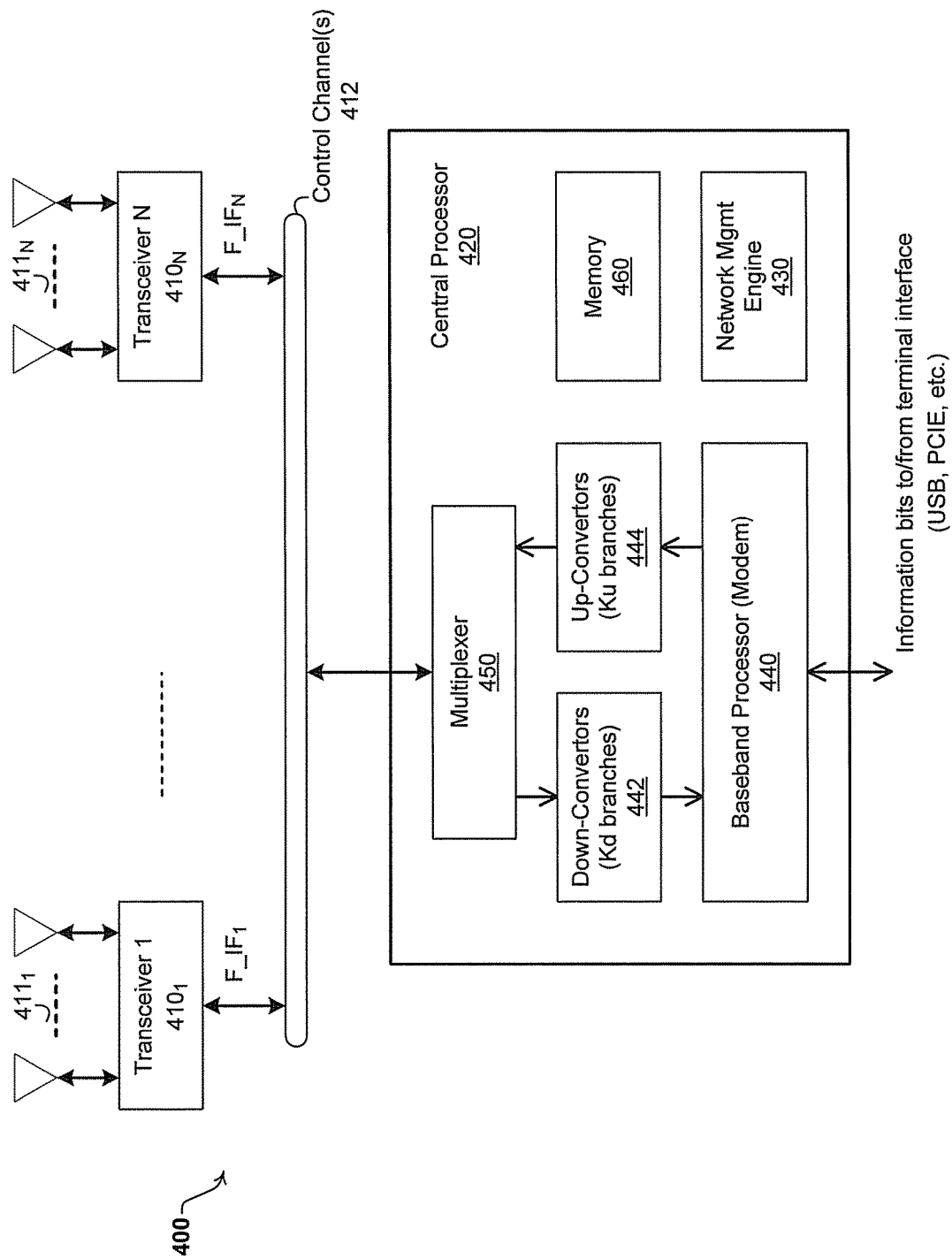
FIG. 4 is a diagram illustrating an exemplary application device with a collection of distributed transceivers that are arranged in a star topology, in accordance with an embodiment of the invention.

FIG. 4 is a diagram illustrating an exemplary application device with a collection of distributed transceivers that are arranged in a star topology, in accordance with an embodiment of the invention. Referring to FIG. 4, there is shown an application device 400, which may comprise a central processor 420 that is connected to a collection of transceivers $410_1$-$410_N$. As shown, the collection of transceivers $410_1$-$410_N$ may be connected to the central processor 420 in a star topology with direct separate cables, for example, from the central processor 420 to each of the collection of transceivers $410_1$-$410_N$.

The distributed transceivers $410_1$-$410_N$ and the central processor 420 may be connected using different topologies. For example, the distributed transceivers $410_1$-$410_N$ may be connected to the central processor 420 using a star topology, whereby direct separate cables may be used, for example, to connect the central processor 420 to each of the collection of transceivers $410_1$-$410_N$. Alternatively, a ring topology may be utilized, whereby a single movable cable or connector, for example, may be used to couple the central processor 420 to any particular one of the distributed transceivers $410_1$-$410_N$ at any given point. In other words, the central processor 420 may connect to one of the distributed transceivers $410_1$-$410_N$, and that connection may then be moved to a different transceiver when needed. One or more control channels between the central processor 420 and the distributed transceivers $410_1$-$410_N$ may be utilized for configuring and managing corresponding transceivers. The number and/or structure of the control channels may differ based on the connectivity topology. For example, with star topology, a plurality of control channels 4121-412N may be to connect the central processer 420 to each of the distributed transceivers $410_1$-$410_N$, and may be utilized for configuring and managing the transceivers $410_1$-$410_N$, respectively. In a ring topology, a single control channel 412 may be used, and may be utilized to the central processor 420 to each particular distributed transceiver $410_x$ at any given point, to enable configuring and managing that transceiver.

While the interface between the central processor 420 and the distributed transceivers $410_1$-$410_N$ may be described as utilizing cable (i.e., the central processor 420 being connected to the distributed transceivers $410_1$-$410_N$ via one or more cables), the invention may not be so limited. Accordingly, in some embodiments of the invention, the cable connection between the central baseband processor and the distributed transceivers may be substituted with an optical connection, printed-board connection, Ethernet cable, or another wireless connection.

The central processor 420 comprises a baseband processor 440, a network management engine 430, down-converters 442, up-converters 444, a multiplexer 450 and a memory 460. The baseband processor 440 may comprise suitable logic, circuitry, interfaces and/or code that may be operable to provide MODEM functionality. In this regard, the central processor 420 may be operable to perform various baseband digital processing such as MIMO, OFDM, channel coding, HARQ, channel estimation and equalization, beamforming algorithms, Timing/Carrier recovery and synchronization. The network management engine 430 may operate in substantially the same manner as the network management engine 218 in FIG. 2. During transmission, a baseband signal supplied from the baseband processor 440 may be translated into an intermediate-frequency (IF) signal. The up-converters 444 may further translate the IF signal to a final radio-frequency (RF) and send it over the air through an antenna array such as the antenna array $411_1$. For reception, the transceiver $410_1$, for example, may pass a received RF signal from the antenna array $411_1$ to the down-converters 442. The down-converters 442 may translate the RF signal into an IF signal. The IF signal may further be translated to a baseband signal to the baseband processor 440, for example. The multiplexer 450 may be responsible for multiplexing receive/transmit signals utilizing either time-division-multiplexing or frequency-domain-multiplexing. The memory 460 may comprise suitable logic, circuitry, interfaces and/or code that may be operable to store information such as executable instructions and data that may be utilized by the baseband processor 440 and/or other associated component units such as, for example, the network management engine 430. The memory 360 may comprise RAM, ROM, low latency nonvolatile memory such as flash memory and/or other suitable electronic data storage.

In some embodiments of the invention, the interface between the central processor 420 and the distributed transceivers $410_1$-$410_N$ may also be configured to allow for supporting the transceivers $410_1$-$410_N$ having digital processing and mixed-signal capability—i.e., to allow for interactions based on non-analog IF connections. For example, the transceivers $410_1$-$410_N$ may include analog-to-digital-converters (ADCs) and digital-to-analog-converters (DACs). In such scenario, a transceiver $410_x$ may receive digital bits from the central processor 420 (through a digital link), after processing via the baseband processor 440 for example, and may use its internal DAC to generate the analog waveform and then perform the frequency up-conversion and beamforming steps. Similarly, a transceiver $410_x$ may receive an RF waveform, down-convert it, and then use its internal ADC to digitize the waveform and send the digital bits over a digital connection/cable to the centralized processor 420 (where it may be further processed via the baseband processor 440 for example). In other embodiments of the invention, the transceivers $410_1$-$410_N$ may comprise more digital processing blocks, in addition to ADC/DAC blocks. In such scenario, a portion of processing within the central processor 420 may be moved (e.g., in terms of partitioning) to the transceivers $410_1$-$410_N$. In the above embodiments—i.e., when there may be need for digital based interfacing between the central processor and the transceivers-digital connections and/or interfaces such as Ethernet and various memory bus protocols may be deployed.

The distributed transceivers $410_1$-$410_N$ may operate in various modes such as spatial diversity mode, frequency diversity mode, multiplexing mode, multiple-input-multiple-output (MIMO) mode, and/or relay mode. Furthermore, in some embodiments, the distributed transceivers $410_1$-$410_N$ may be configured to switch between spatial diversity mode, frequency diversity mode, multiplexing mode, multiple-input-multiple-output (MIMO) mode, and/or relay mode based on corresponding propagation environment conditions, link quality, device capabilities, device locations, usage of resources, resource availability, target throughput, application QoS requirements.

In spatial diversity mode, the central processor 420 may be operable to utilize the distributed transceivers $410_1$-$410_N$ to establish a spatial diversity link with intended end user device such as the end-user application device 220. For example, only a portion of the distributed transceivers $410_1$-$410_N$ that may have strong propagation channel responses are activated and other transceivers are switched off for power saving. In another example, the distributed transceivers $410_1$-$410_N$ may be arranged such that the master application device 210 (the transmitter) with available LOS towards the end-user device 220 (the receiver) may be configured to directly beam towards the receiver. In an exemplary embodiment of the invention, each active distributed transceiver may communicate data streams utilizing the same final carrier frequency. In frequency diversity mode, the central processor 420 may manage the distributed transceivers $410_1$-$410_N$ similar to spatial diversity mode except that each active distributed transceiver may utilize a different final carrier frequency if such frequency spectrum channel is available.

In multiplexing mode, the central processor 420 may manage the distributed transceivers $410_1$-$410_N$ in such a way that different streams of data may be transmitted through different sets of the distributed transceivers $410_1$-$410_N$. For example, in multiplexing mode, different distributed transceivers of the distributed transceivers $410_1$-$410_N$ may be dynamically programmed such that each transceiver's maximum pattern gain may be pointing to a different direction or reflector. As the environment changes (and hence location of reflectors and end user unit change), the antenna pattern of the distributed transceivers $410_1$-$410_N$ may be re-adjusted. In MIMO mode, the central processor 420 may manage the distributed transceivers $410_1$-$410_N$ in such a way that different streams of data may be transmitted through different sets of the distributed transceivers $410_1$-$410_N$ to a single receiver device such as the end-user application device 220.

In relay mode, the central processor 420 may manage the distributed transceivers $410_1$-$410_N$ to support relay mode of operation, whereby the application device 400 may be utilized in relaying data streams between two other devices. In this regard, the star topology implementation may particularly be suited for relay operations, enabling reception of input data stream from a first device, via a first set of the distributed transceivers $410_1$-$410_N$, and (re)transmission of the received data stream to a second device via a second set of the distributed transceivers $410_1$-$410_N$. The selection of the first and second sets of the distributed transceivers $410_1$-$410_N$, and the configuration thereof may be performed adaptively and/or dynamically. In this regard, the transceivers utilized in receiving and/or transmitting the relayed streams may be selected in order to optimize the relaying of communication between the distributed transceivers. This may comprise, for example, selecting and/or configuring the transceivers such that radio frequencies and/or channels may be reused efficiently. For example, use of beamforming may enable mitigating potential interference between incoming and outgoing signals so as to allow using the same radio frequency (RF). In other words, the same RF channel/spectrum may be reused in a manner that may allow for maintaining links with the two end devices utilizing physically separated transceivers that may use non-overlapping antenna patterns to minimize interference. Furthermore, the transceiver(s) maybe be configured to use only some of the antennas available therein (e.g., subset of the antenna array), and/or may allow for use of transceivers without array processing.

In an embodiment of the invention, the application device 400 may be dynamically configured to switch between relay mode of operation and other modes of operation, such as spatial diversity, frequency diversity, multiplexing, and/or MIMO modes of operation. The switching between the modes may be done based on the network management engine 430 reading and analyzing of communication related data, which may comprise data pertaining to network requirements, data traffic, throughput and/or QoS requirements, spectrum availability, and/or desire for relay nodes. Once the communication related data is read and/or analyzed, the network management engine 430 and/or the central processor 420 may then use policies and/or rules to determine when a transition to and/or from relay mode of operation may be warranted. For example, one such rule/policy may provide the highest QoS for a first device regardless of other devices/users. In this case, even if there is another device/user that is requesting access to spectrum, the network management engine 430 may still continue to configure the first device to occupy two frequency channels in order to guarantee higher QoS and link reliability for the first device. In another example, if the rule/policy is more neighbor-friendly, the network management engine 430 continuously instructs the first device to see if the throughput requirements can be satisfied by using only one frequency channel and by relying on "spatial multiplexing." As soon as the first device finds sufficiently orthogonal directions in one frequency channel, the "network management engine" instructs the first device to exit the "Frequency Diversity" mode in order to free up bandwidth for other devices/users. Based on this policy, even if no other device is requesting access for frequency spectrum, the first device still switches to using one frequency channel as soon as its QoS becomes satisfied.

Figure 5A:
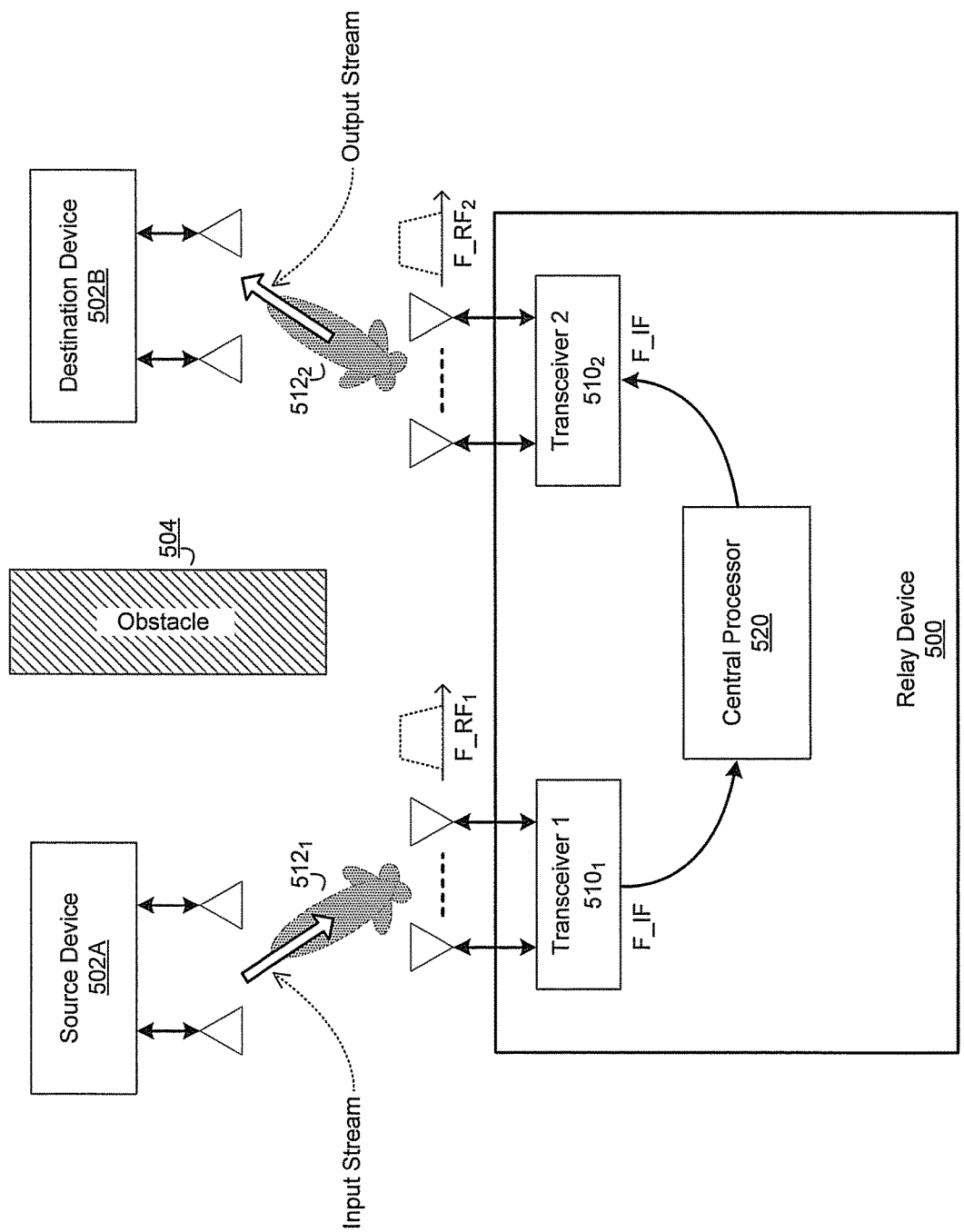
FIG. 5A is a diagram illustrating an exemplary relay device that utilizes distributed transceivers in forwarding data streams, in accordance with an embodiment of the invention.

In an embodiment of the invention, the relay mode of operation may incorporate attributes and/or configuration policies and/or rules pertaining to one or more of the other modes of operations. In this regard, configuring the application device 400 to relay mode of operation may comprise selecting and/or applying elements from one or more of the spatial diversity, frequency diversity, multiplexing, and/or MIMO modes of operations. For example, when utilized as a relay device, the distributed transceivers of the application device 400 may be configured to incorporate spatial diversity, frequency diversity, multiplexing, and/or MIMO to receive input data streams from the source device and/or for retransmission(s) to one or more of the destination devices FIG. 5A is a diagram illustrating an exemplary relay device that utilizes distributed transceivers for forwarding data streams, in accordance with an embodiment of the invention. Referring to FIG. 5A, there is shown a relay device 500, a source device 502A, a destination device 502B, and an obstacle 504.

The source device 502A and the destination device 502B may correspond to the original source of the relayed data stream and the ultimate destination for the relayed data stream. Alternatively, one or both of the source device 502A and the destination device 502B may correspond to another relay device, such as when the relay device 500 joins a relay mesh, such as relay mesh 150. In this regard, one or both of the source device 502A and the destination device 502B may correspond to a relay device traversed during relaying of data streams between the original source and the intended destination device(s) for the data stream.

The relay device 500 may comprise an application device supporting distributed transceiver (DT) structure, similar to the end-user application device 210 of FIG. 2 and/or any of the application devices $152_1$-$152_N$ of FIG. 1B, for example. In this regard, the relay device 500 may be operable to support relay modes of operations, whereby the relay device 500 may be configured to relay data streams between two devices, such as the source device 502A and the destination device 502B. The relay device 500 may comprise a central processor 520 and a plurality of transceivers $510_x$, of which a first transceiver $510_1$ and second transceiver $510_2$ are shown.

The central processor 520 may be substantially similar to the Central Processor 420, as described with respect to FIG. 4. In this regard, the central processor 520 may additionally be operable to support and/or manage relay mode of operation related functions in the relay device 500. In particular, the central processor 520 may be operable to select and/or configure transceiver(s) that may be optimally utilized to handle reception and retransmission of relayed data streams.

In some embodiments, the relay device 500 may use different carrier frequencies (e.g., 900 MHz, 2.4 GHz, 2.7 GHz, 5 GHz, 60 GHz, etc.) and/or different wireless protocols (e.g., IEEE 802.11a/b/g/n/ac/ad, LTE, WiGig, etc.) to connect to devices 502A and 502B. For example, the connection to device 502A may be configured over 60 GHz carrier frequency using, for example, WiGig air interface, whereas the connection to device 502B may be configured over 2.7 GHz using, for example, LTE air interface. In some embodiments, the total available distributed transceivers within device 500 may be dynamically allocated to different relay links, such as based on the links' requirements (e.g., link throughput, link distance). For example, the NME (e.g., NME 430) may decide to allocate three distributed transceivers to establish a link with device 502A (where those three transceivers may be configured in spatial/frequency diversity or MIMO modes) and to allocate only one distributed transceiver to establish a link with device 502B.

In some embodiments, the relay device 500 may establish relay links to more than two devices. For example, device 500 may receive data from two source devices (utilizing several of its transceiver resources), may combine and/or merge the data, then may split the data into three data streams, and send the three data streams to three destination devices (by utilizing several of its transceiver resources).

In some embodiments, a device with distributed transceivers (e.g., device 500) may take the role of an "Access Point" or "Base Station". In this case, the access point device may utilize its transceiver resources to connect (transmit/receive) to multiple end devices, such as by dynamic allocation of frequency band resources and distributed transceiver resources. The access point device may use some of its transceiver resources to establish a "wireless backhaul link" to other access points or any other node in the network. All modes of operation (spatial diversity, frequency diversity, spatial multiplexing, and MIMO processing) may be utilized by the access point device for any of its connections.

Each of the transceivers $510_1$ and $510_2$ may be similar to any of the distributed transceivers $410_x$, substantially as described with respect to FIG. 4. In this regard, each of the transceiver $510_1$ and transceiver $510_2$ may comprise a plurality of antennas, which may be configured in accordance with particular mode of operation, which may comprise in addition to spatial diversity mode, frequency diversity mode, multiplexing mode and multiple-input-multiple-output (MIMO) mode, one or more relay modes of operations. For example, available relay modes of operation may comprise a passive (or pass-through) mode of operation and active mode of operation. In passive mode of operation, no processing of the received, relayed signal is performed prior to re-transmission. In this regard, when operating in passive relay mode, the relay device 500 may simply down-convert the received radio frequency $RF_1$ waveform of the signals received from the source device 502A to intermediate frequency IF, may re-amplify the signal, and then may up-convert the IF waveform to frequency $RF_2$ for transmission to the destination device 502B, without requiring any data demodulation by the central processor 520. The passive mode of operation may be utilized when the quality of the received waveform is deemed sufficient for passive relaying. In this regard, the quality of received waveform may be determined based on calculation of signal-to-noise ratio (SNR). With active mode of operation, some processing may be performed within the relay device 500, such as via the central processor 520. In this regard, during active relay mode, the received waveform $RF_1$ may be demodulated by the central processor 520, after conversion to the intermediate frequency IF, and then re-modulated to be transmitted to the destination device 502B over radio frequency $RF_2$.

In operation, the relay device 500 may be configured in relay mode of operation. In this regard, the relay device 500 may relay data streams between two different devices. The relaying via the relay device 500 may be necessitated by the lack of line-of-sight (LOS) between the source device 502A and the destination device 502B, such as due to the obstacle 504, which prevents establishing direct links between the devices. Alternatively, data may be relayed via the relay device 500 even when the source device 502A and the destination device 502B may be able to establish direct links, but use of such direct links may be undesirable. In this regard, determining that relaying data via the relay device 500 may be optimal may be based on capabilities of the relay device 500, the source device 502A, and/or the destination device 502B. For example, one or both of the source device 502A and the destination device 502B may be a low-power device (or temporarily low on battery charge) which may not be able to provide the transmit power required for providing the necessary beamforming gain, and using the relay device 500 may enable saving power in the device(s).

During typical relay operation, the relay device 500 may receive a stream of data from the source device 502A, over carrier frequency $RF_1$ and at a particular direction D1, and may subsequently retransmit the received data stream to the destination device 502B, over frequency $RF_2$ and at a different direction D2. In some instances, the reception and retransmission can be done concurrently, over the same or different frequency channels. Alternatively, the reception and retransmission may be performed in a time-multiplexed manner. In instances when a plurality of relay modes of operations are available, such as passive mode and active mode, a particular mode of operation may be selected, with communication related components and/or operations being configured based on that selection. The particular mode of operations may be selected based on monitoring and/or determining various communication and/or performance related parameters. For example, passive mode of operation may be selected when quality of received signal, which may be determined based on measured SNR, may be deemed sufficient to enable retransmission without requiring additional processing (demodulation and re-modulation) of the carried data.

In some embodiments of the invention, frequencies $RF_1$ and $RF_2$ may be the same radio frequency (RF), to enable maximizing reuse of frequency spectrum. The use of the same radio frequency may be made possible by use of propagation configuration techniques that may mitigate possible interference between the reception paths and the retransmission paths. In this regard, the relay device 500 may utilize non-overlapping (non-aligned) beam patterns $512_1$ and $512_2$ for receiving and retransmitting so that the same frequency and/or channel may be utilized for both reception and re-transmission.

In some embodiments of the invention, the relay device 500 may perform various optimization measures to improve the effectiveness and/or efficiency of relay operations. For example, the relay device 500 may adaptively select antenna(s) used in receiving and/or transmitting the relayed data streams, to minimize the number of antennas used. In this regard, the relay device 500 may measure the signal power of the signal received from source device (502A). Based on the link throughput between the source device (502A) and the relay device 500, the relay device 500 may utilize the minimum number of antennas required to establish and maintain the link (with sufficient margin). These antennas may then be combined and connected to one RF-to-IF converter chain. The antennas may correspond to an antenna array (or subset thereof) of a single transceiver, such as transceiver $510_1$. Alternatively, the minimum number of antenna required may be a combination from multiple transceivers.

For example, the relay device 500 may use on the receive side, a particular transceiver (e.g., transceiver $510_1$) with all antennas thereof being active, and also require use of a second transceiver (e.g., transceiver $510_2$), with only a subset of antennas thereof being active. On the transmit side, a subset or all of the remaining antennas of the second transceiver may be grouped together and connected to the other IF-to-RF up-convertor, for transmission of signals to the destination device 502B. In this regard, determining and/or selecting the transmit side antennas may depend on the distance to the destination device 502B, the transmit power per antenna, and/or the desired width of the antenna pattern. In some embodiments, the NME may decide to allocate a subset of transceivers to receive incoming waveform (e.g., depending on channel/throughput requirements) and allocate another subset to transmit the signal to the destination device. When multiple transceivers are utilized for each link, then various diversity configurations (frequency, spatial) may be utilized based on channel/traffic/throughput conditions.

The relay device 500 may also be operable to improve frequency spectrum reuse, whereby the relay device 500 may coordinate the time slots used for packet transmissions and receptions from the source device and/or to the destination device(s), to minimize the cross-interference when the same frequency is used. In this regard, the relay device 500 may use the same time slots to simultaneously transmit packets to both source device and the destination device(s) while using common time slots for simultaneously receiving packets. This may enable minimizing co-interference between transceiver(s) used on the receive side (e.g., transceiver $510_1$) to transceiver(s) used on the transmit side (e.g., transceiver $510_2$), and vice versa.

The relay device 500 may re-use the same frequency channel for linking to both the source device 502A and the destination device 502B—i.e., $F\_RF_1$ is the same as $F\_RF_2$. This mode of operation may be enabled when, for example, less frequency channels are available or the frequency channels are being used by other devices in the vicinity. The relay device 500 may consider various communication and/or network related conditions when determining if/when to switch between the two modes of operations—that is between using different frequency channels for $F\_RF_1$ and $F\_RF_2$ and using the same frequency channels for $F\_RF_1$ and $F\_RF_2$. Exemplary conditions that may be considered comprise, for example: 1) the distance between transceivers $510_1$ and $510_2$ within the relay device 500s (e.g., the larger the separation, the higher the weight that the system may give to reusing the same frequency); 2) the widths of antenna beam patterns of transceivers $510_1$ and $510_2$, as well as beam patterns of source device 502A and the destination device 502B (e.g., the narrower the beam patterns, the less the cross interference; hence the system gives a higher weight to reusing the same frequency); 3) level of orthogonality (or angular separation) between the antenna patterns of transceivers $510_1$ and $510_2$ within the relay device 500 (e.g., the better the orthogonality, the system gives higher weight to reusing the same frequency); 4) angular separation, or difference in directions of links established by the relay device 500 to the source device 502A and the destination device 502B (e.g., the larger the angular separation, the system gives higher weight to reusing the same frequency); and 5) link quality requirements, such as link SNR requirements (e.g., the lower the SNR requirements, the links can tolerate higher level of interference; hence the system gives higher weight to reusing the same frequency).

In some embodiments of the invention, resources may be shared during relay operations in the relay device 500, such as when the relay device 500 is utilized to concurrently relay different steams, for example between different pairs of devices. In this regard, the distributed transceivers of the relay device 500 may be configured to establish multiple parallel wireless links, and resources of the relay device 500 may be optimally shared during handling of communications via these parallel wireless links. For example, dedicated transceivers may be assigned to different traffic categories—e.g., one link dedicated to CPU sharing, one to memory sharing for reduced latency, and one dedicated to internet traffic. Also, different types of traffic may be partitioned to dedicated wireless links. For example, low latency traffic may use a low latency link, whereas Internet data traffic may be routed over an Internet link.

Figure 5B:
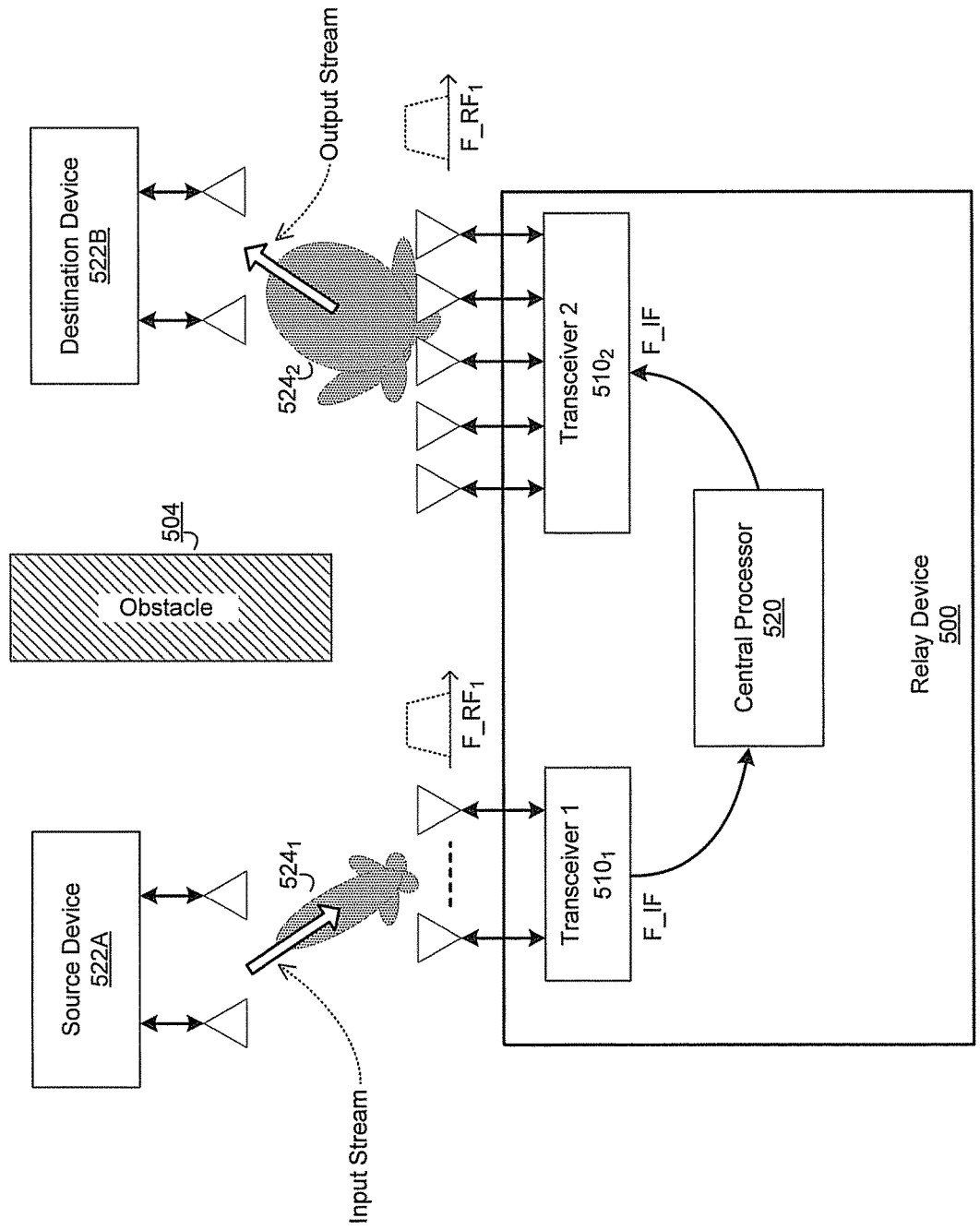
FIG. 5B is a diagram illustrating an exemplary relay device that utilizes distributed transceivers for forwarding data streams, with varying beamforming configurations for the receive side and the transmit side, in accordance with an embodiment of the invention.

FIG. 5B is a diagram illustrating an exemplary relay device that utilizes distributed transceivers for forwarding data streams, with varying beamforming configurations for the receive side and the transmit side, in accordance with an embodiment of the invention. Referring to FIG. 5B, there is shown the relay device 500 of FIG. 5A. Also shown in FIG. 5B is a source destination device 522A and a destination device 522B. The source destination device 522A and the destination device 522B may be similar to the source destination device 502A and the destination device 502B, substantially as described with respect to FIG. 5B.

In operation, the source destination device 522A and the destination device 522B may utilize the relay device 500 for relaying data streams between the destination device 522A and the destination device 522B when communicating the data streams between the devices is not possible or desirable. In some instances, the capabilities of the source and destination devices may vary, and/or communication requirements and/or limitations associated with transmission or reception of data to/from the devices may be different. As such, the relay device 500 may be operable to configure the transceiver resources based on the capabilities and/or limitations of each of the source and destination devices, respectively, and/or links therewith, in a manner that may allow for different beamforming characteristics—e.g., beams having different width. For example, the source device 522A may comprise a low-transmit-power and/or low-power-supply device, and/or may comprise limited communication capabilities—e.g., comprising only one antenna transmitter, such as when the source device 522A comprises a smartphone. The source device 522A, however, may need to establish a high-throughput link to the destination device 522B, such as when the destination device 522B may be a TV or similar display-capable device, to which the source device 522A may seek to direct its multimedia streams for enhanced playback (i.e., larger/better screen).

In instances where the destination device 522B is located too far from the source device 522A (e.g., across a large room), however, the capabilities and/or resources (including remaining battery charge) of the source device 522A may not be sufficient to create and/or maintain such a link. Rather, the data streams may be sent indirectly, through the relay device 500 for example, such as when the relay device 500 is located close to the source device 522A and/or where the relay device 500 may comprise more capabilities and/or resources (e.g., a laptop), and the ability to re-configure its antenna and transceiver resources into relay operation mode. In such scenario, the source device 522A may only need to configure its antenna(s) to create a short link to the relay device 500, and may be able to achieve the required throughput (due to the shortness of the distance) while forming a narrow beam pattern $524_1$ that would not interfere with the transmission of the relay device 500. This may greatly lower the power consumption in both the smartphone and the relay device 500, associated with communication of the input data stream from the source device 522A to the relay device 500 without degrading the link quality.

On the transmit side, the relay device 500 may use its remaining antenna and transceiver resources (or a subset thereof) to create a link from the relay device 500 and the destination device 522B. In this regard, the relay device 500 may allocate more resources, including a larger number of antennas, to the transmit side, and accordingly the relay device 500 may be able to achieve more omni-directional antenna pattern (wider beam lobe) $524_2$, while maintaining a high average omni-transmit power. In other words, the relay device 500 may be able to establish a transmit side link that is sufficiently powerful to ensure delivery of the data stream to the destination device 522B, while not encountering any interference issues. The ability to establish the link with a wider beam lobe may make the link less susceptible to direction estimation errors. This asymmetric and dynamic allocation of resources by the relay device 500 among its links with the source and destination devices may be determined and/or configured based on a plurality of communication or performance parameters, such as, for example, distance between the relay device 500 to the source device 522A and destination device 522B, respectively; power available at the transmit and/or receive sides; quality (e.g., SNR) of the links; power capabilities of the source device 522A and/or destination device 522B; and/or antenna beamforming capabilities of the source device 522A and/or destination device 522B.

Figure 6:
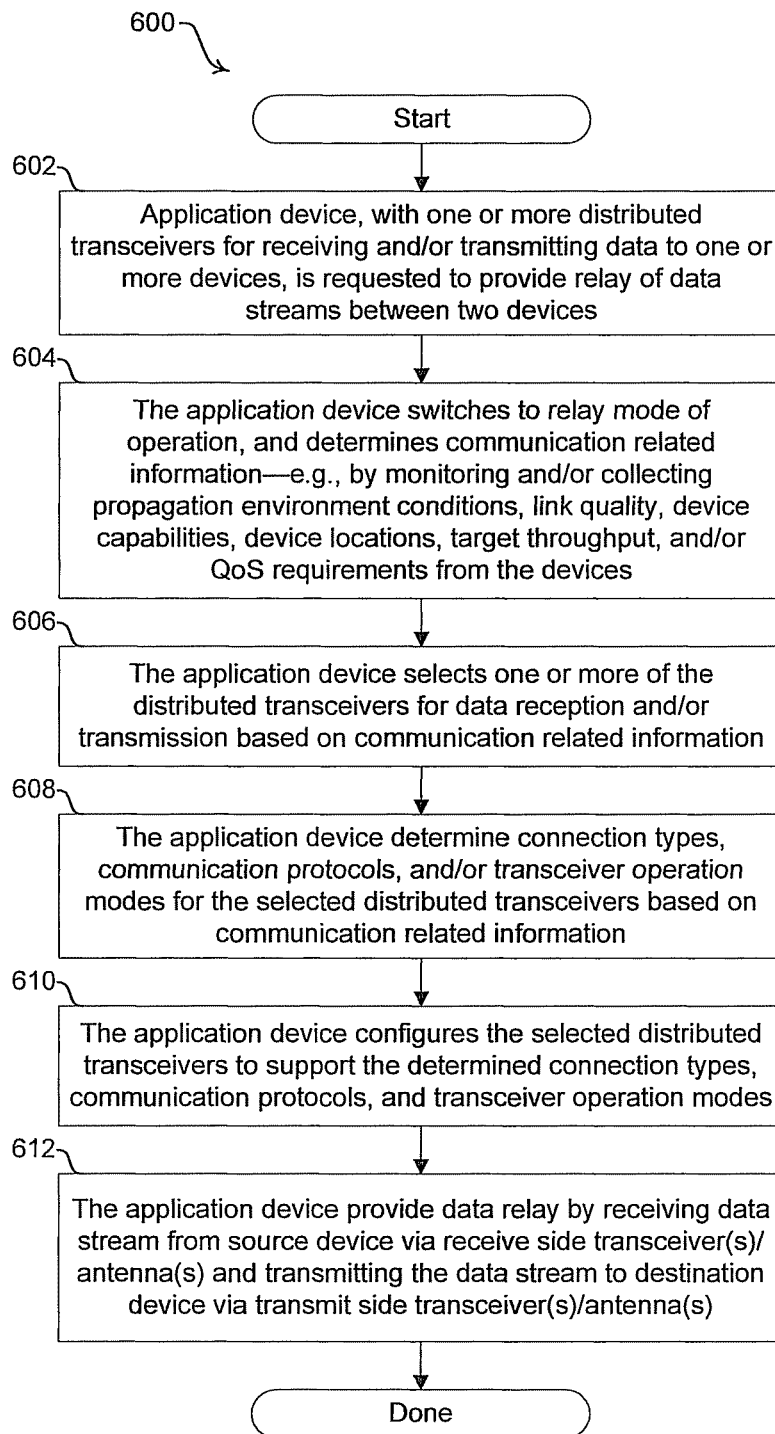
FIG. 6 is a flow chart that illustrates exemplary steps for relaying data streams via a device that comprises distributed transceivers, in accordance with an embodiment of the invention.

FIG. 6 is a flow chart that illustrates exemplary steps for relaying data streams via a device that comprises distributed transceivers, in accordance with an embodiment of the invention. Referring to FIG. 6, there is shown a flow chart 600 comprising a plurality of exemplary steps for performing repeating service in a relay device, such as the relay device 500.

In step 602, an application device with one or more distributed transceivers for receiving and/or transmitting data to one or more devices, such as device 500, may be requested to provide relay of data streams between two devices. For example, the relay device 500 may receive a request from a source device (e.g., the source device 502A) to relay a data stream from the source device to a destination device (e.g., the destination device 502B). In step 604, the application device may switch to a relay mode of operation, and may determine (before or after the switch) communication related information pertinent to the relay mode. In this regard, the application device may monitor and/or collect, for example, propagation environment conditions, link quality, device capabilities, device locations, target throughput, and/or QoS requirements from the devices. In step 606, the application device may select one or more of the distributed transceivers for data reception and/or transmission based on communication related information determined in step 604. In step 608, the application device may determine connection types, communication protocols, and/or transceiver operation modes for the selected distributed transceivers based on communication related information. In step 610, the application device may configure the selected distributed transceivers to support the determined connection types, communication protocols, and transceiver operating modes. In step 612, the application device may provide relay servicing by receiving data stream from the source device via receive side transceiver(s)/antenna(s) and transmitting the data stream to the destination device via transmit side transceiver(s)/antenna(s).

Various embodiments of the invention may comprise a method and system for a repeater network that utilizes distributed transceivers with array processing. The relay device 500 may be configured to operate in a relay mode, in which the relay device 500 may be utilized to relay input data streams from source devices (e.g., 502A or 522A) to one or more destination devices (e.g., 502B or 522B). In this regard, relay operations may comprise configuring one or more of the plurality of distributed transceivers (e.g., transceiver $510_1$ and $510_2$) to operate in a particular mode of relay operation. The input data stream may be then be received from the source device via at least one of the configured distributed transceivers. One or more relay data streams, corresponding to the input data stream, may then be transmitted to the destination device(s), via at least one of the configured distributed transceivers. The destination device(s) may comprise other relay device(s), and/or the intended destination device for the input data stream. The source device may comprise another relay device and/or an original source device for the input data stream. The particular mode of relay operation may be determined, such as by the central processor 520, based on one or more performance criteria, which may pertain to link quality and/or propagation environment.

The particular mode of relay operation may be selected, by the central processor 520, from a plurality of modes of relay operation. In this regard, the plurality of modes of relay operation may comprise a passive mode of relay operation and an active mode of relay operation. The passive mode of relay operation may comprise forwarding the data stream unprocessed The active mode of relay operation may comprise performing digital signal processing by the baseband processor 440 of the relay device 500 during the reception of the input data stream and/or transmission of the at least one relay data stream. The network management engine 430 may monitor during relay operations, one or more communication parameters or conditions associated with the configuration of the one or more of the plurality of distributed transceivers. Beamforming settings and/or antenna arrangement for at least one of the configured distributed transceivers may be configured, via the central processor 520, based on the monitoring. The relay device 500 may determine and/or select connection types and communication protocols that may be applied to the relay operations, and may allocate resources to the one or more of the plurality of distributed transceivers. Resources may be shared among the one or more of the plurality of distributed transceivers during the relay operations.

All the embodiments may be applied to cases where a set of devices are used in relay mode to transfer data from a source device to a destination device. In this case, the data is transferred after several relay hops through intermediate relay devices. Intermediate relay devices utilize their transceivers (in accordance to several of disclosed embodiments) to establish intermediate wireless links.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for repeater network that utilizes distributed transceivers with array processing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a relay device that comprises a plurality of antenna arrays:
configuring a first beamforming setting for a first set of antenna arrays of the plurality of antenna arrays of the relay device to establish a first link between the relay device and a source device;
receiving a first data stream with a first beam pattern from the source device through the first link and forwarding a second data stream with a second beam pattern to a destination device through a second link without de-modulating the first data stream; and
phase shifting, by an antenna array of the plurality of antenna arrays, an incoming signal stream and an outgoing signal stream by a different value for each element within the first set of antenna arrays to minimize an interference between the incoming signal stream and the outgoing signal stream, respectively, through the phase shifting.

2. The method according to claim 1, further comprising:
configuring a second beamforming setting for a second set of antenna arrays of the plurality of antenna arrays of the relay device to establish the second link between the relay device and the destination device; and
forwarding the second data stream to the destination device via at least one intermediate relay device,
wherein the second data stream is forwarded to the destination device based on an availability of Line-of-sight (LOS) links between a plurality of relay nodes.

3. The method according to claim 2, further comprising monitoring communication parameters associated with at least one of the first set of antenna arrays or the second set of antenna arrays.

4. The method according to claim 1, wherein the first data stream is same as the second data stream.

5. The method according to claim 1, wherein the first beam pattern is different from the second beam pattern.

6. The method according to claim 1, further comprising sharing resources of the relay device among the plurality of antenna arrays.

7. The method according to claim 1, wherein at least one antenna array of the plurality of antenna arrays includes a single antenna element.

8. The method according to claim 1, further comprising determining connection types and communication protocols, and allocating resources of the relay device to the plurality of antenna arrays.

9. A system, comprising:
a relay device that comprises a plurality of antenna arrays, wherein the relay device is configured to:
configure a first beamforming setting for a first set of antenna arrays of the plurality of antenna arrays of the relay device to establish a first link between the relay device and a source device;
receive a first data stream with a first beam pattern from the source device through the first link and forward a second data stream with a second beam pattern to a destination device through a second link without de-modulating the first data stream; and
phase shifting, by an antenna array of the plurality of antenna arrays, an incoming signal stream and an outgoing signal stream by a different value for each element within the first set of antenna arrays to minimize an interference between the incoming signal stream and the outgoing signal stream, respectively, through the phase shifting.

10. The system according to claim 9, wherein the relay device is further configured to configure a second beamforming setting for a second set of antenna arrays of the plurality of antenna arrays of the relay device to establish the second link between the relay device and the destination device,
and wherein the second data stream is forwarded to the destination device via at least one intermediate relay device, and
and wherein the second data stream is forwarded to the destination device based on an availability of Line-of-sight (LOS) links between a plurality of relay nodes.

11. The system according to claim 10, wherein the relay device is further configured to monitor communication parameters associated with at least one of the first set of antenna arrays or the second set of antenna arrays.

12. The system according to claim 9, wherein the first data stream is same as the second data stream.

13. The system according to claim 9, wherein the first beam pattern is different from the second beam pattern.

14. The system according to claim 9, wherein the relay device is further configured to determine connection types and communication protocols for the plurality of antenna arrays and allocate resources of the relay device to the plurality of antenna arrays.

15. The system according to claim 9, wherein the relay device is further configured to share resources of the relay device among the plurality of antenna arrays.

16. The system according to claim 9, wherein at least one antenna array of the plurality of antenna arrays includes a single antenna element.

* * * * *